United States Patent
Jeong et al.

(10) Patent No.: US 7,957,233 B2
(45) Date of Patent: Jun. 7, 2011

(54) NEAR-FIELD GAP PULL-IN METHOD AND OPTICAL DISC APPARATUS THEREFOR

(75) Inventors: An-sik Jeong, Hwaseong-si (KR); Jong-hyun Shin, Suwon-si (KR); Kyung-geun Lee, Seongnam-si (KR); Tatsuhiro Otsuka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 12/180,603

(22) Filed: Jul. 28, 2008

(65) Prior Publication Data

US 2009/0154309 A1    Jun. 18, 2009

(30) Foreign Application Priority Data

Dec. 12, 2007  (KR) .................. 10-2007-0128754

(51) Int. Cl.
*G11B 7/00* (2006.01)
(52) U.S. Cl. .............. 369/44.32; 369/53.23; 369/53.28
(58) Field of Classification Search ........... 369/44.32, 369/44.35, 53.28, 53.23
See application file for complete search history.

(56) References Cited

U.S. PATENT DOCUMENTS

| 7,394,734 B2 * | 7/2008 | Ishimoto ............... 369/44.35 |
| 7,613,082 B2 * | 11/2009 | Ishimoto et al. ........ 369/44.32 |
| 7,755,986 B2 * | 7/2010 | Ishimoto ............... 369/44.23 |
| 2001/0021145 A1 | 9/2001 | Ichimura et al. |
| 2005/0190666 A1 | 9/2005 | Ishimoto |
| 2006/0280063 A1 | 12/2006 | Ishimoto |
| 2008/0062854 A1 * | 3/2008 | Nakaoki et al. .......... 369/218 |

FOREIGN PATENT DOCUMENTS

WO  WO 2007/114567   10/2007

OTHER PUBLICATIONS

International Search Report of PCT International Application No. PCT/KR2008/003714 on Aug. 28, 2008.

* cited by examiner

*Primary Examiner* — Aristotelis Psitos
(74) *Attorney, Agent, or Firm* — NSIP Law (57) ABSTRACT

A gap pull-in method and an optical disc apparatus. Whether light condensed on a disc as an actuator ascends is near-field light is determined using a gap error signal. The range of an actuator driving voltage value during a section where the decrease rate of the gap error signal is constant is obtained when it is determined that the light condensed on the disc is near-field light. Gap pull-in is performed on the disc during a section where the actuator driving voltage value is within the obtained range.

20 Claims, 4 Drawing Sheets

NEAR-FIELD GAP PULL-IN METHOD AND OPTICAL DISC APPARATUS THEREFOR

CROSS-REFERENCE TO RELATED APPLICATION

This application claims all benefits accruing under 35 U.S.C. §119 from Korean Patent Application No. 2007-128754, filed on Dec. 12, 2007, in the Korean Intellectual Property Office, the disclosure of which is incorporated herein by reference.

BACKGROUND OF THE INVENTION

1. Field of the Invention

Aspects of the present invention relate to a gap pull-in method and an optical disc apparatus therefor, and more particularly, to a method of performing gap pull-in more stably by preventing corruption with a disc in a near-field and an optical disc apparatus therefor.

2. Related Art

A near-field optical disc apparatus achieving large capacity and high data transfer rate (DTR) has recently been proposed. The near-field optical disc apparatus is also called a near-field recording system. The near-field optical disc apparatus records data on a disc or reproduces data from the disc using light in a near-field in which light diffraction does not occur. Therefore, the near-field optical disc apparatus needs to control such that a gap distance between an end surface of a solid immersion lens (SIL) mounted on a light focusing element, such as an object lens or the like, and an optical disc is very small, for example, several tens of nm. The gap distance is half of a wavelength of input laser light. In the case of a blue violet laser having a wavelength of 400 nm, the gap distance is approximately 200 nm.

In the near-field optical disc apparatus, when an actuator ascends and a near-field is formed, since an optical disc absorbs some incident light, an amount of reflected light decreases, thereby decreasing a gap error signal level. When the gap error signal level decreases to the target point, the near-field optical disc apparatus performs gap pull-in.

However, because the gap distance is very small, for example, several tens of nm as described above, when overshoot occurs during gap pull-in, the SIL may collide with a disc. The overshoot may occur, for example, due to decrease in the dynamic characteristics of the actuator or contamination of the SIL. In addition, as each disc has different reflectivity, the gap error signal changes, and stability is reduced when controlling gap servo depending on the gap distance.

SUMMARY OF THE INVENTION

Aspects of the present invention provide a gap pull-in method capable of stably performing gap pull-in during a section where a gap error signal changes linearly and an optical disc apparatus therefor.

Additional aspects and/or advantages of the invention will be set forth in part in the description which follows and, in part, will be obvious from the description, or may be learned by practice of the invention.

According to an aspect of the present invention, a gap pull-in method is provided. The method includes determining whether light focused on a disc as an actuator ascends is near-field light, based on a gap error signal; obtaining the range of an actuator driving voltage value during a period of time where the decrease rate of the gap error signal is constant when the light focused on the disc is near-field light; and performing gap pull-in on the disc during a period of time where the actuator driving voltage value is within the obtained range.

According to another aspect of the present invention, whether the decrease rate of the gap error signal is constant may be determined by differentiating the slope of the gap error signal and determining whether the differentiated value is constant. The obtaining of the range of the actuator driving voltage value may include holding or storing an actuator driving voltage value at a time when the decrease rate of the gap error signal becomes constant as a first driving voltage value; and holding or storing an actuator driving voltage value at a time when the constant decrease rate of the gap error signal changes as the actuator ascends as a second driving voltage value, wherein the gap pull-in is performed on the disc during a period of time where the actuator driving voltage value is between the first and second driving voltage values. The method may further include stopping driving of the actuator after the holding or storing of the second driving voltage value. The performing of the gap pull-in on the disc may include obtaining the average value of the first and second driving voltage values; and applying a voltage to the actuator as a driving voltage, the driving voltage having the average value of the first and second driving voltage values as a maximum value. The applying of the driving voltage e to the actuator may include generating a step voltage having the average value of the first and second driving voltage values as a maximum value; filtering the step voltage through a low pass filter; applying the filtered voltage to the actuator as a driving voltage; and performing gap pull-in on the disc when the applied driving voltage is within a predetermined range of the average value of the first and second driving voltage values. The method may further include performing gap servo when the applied driving voltage is within a predetermined range of the average value of the first and second driving voltage values.

According to another aspect of the present invention an optical disc apparatus is provided. The apparatus includes a condenser to condense light radiated from a light source onto a disc and to receive light returned from the disc; an actuator to raise or lower the condenser vertically with respect to the disc based on an actuator driving voltage; a light amount detector to detect an amount of light returned from the disc through the condenser; a servo module to generate the actuator driving voltage and a gap error signal based on the light amount detected by the light amount detector; and a control module to obtain the range of the actuator driving voltage during a period of time where the decrease rate of the gap error signal is constant based on the gap error signal and the actuator driving voltage, when light focused on the disc is near-field light, and to control the servo module such that gap pull-in is performed on the disc during a period of time where the actuator driving voltage value is within the obtained range.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
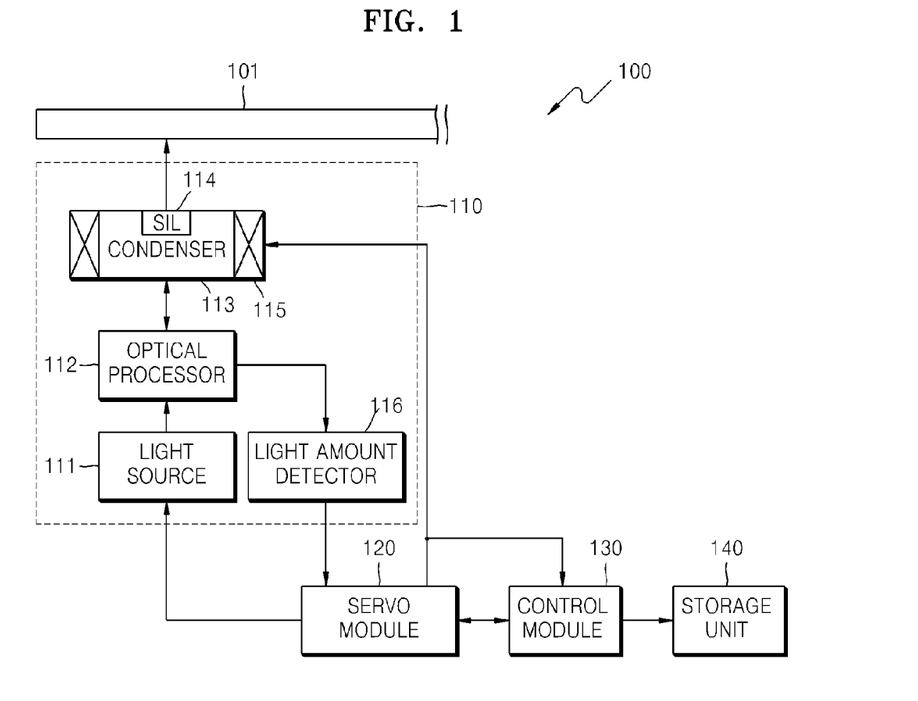
FIG. 1 is a schematic view of a near-field optical disc apparatus according to an example embodiment of the present invention.

FIG. 1 is a schematic view of a near-field optical disc apparatus 100 according to an example embodiment of the present invention. The near-field optical disc apparatus 100 includes an optical head 110, a servo module 120, a control module 130, and a storage unit 140. According to other aspects of the present invention, the near-field optical disc apparatus 100 may include additional and/or different units. Similarly, two or more of the above units may be integrated into a single component. The optical head 110 includes a light source 111, an optical processor 112, a condenser 113 including a solid immersion lens (SIL) 114, an actuator 115, and a light amount detector 116.

The light source 111 may include a laser diode. The light source 111 radiates light when power is turned on by the servo module 120. The optical processor 112 transfers the light radiated from the light source 111 to the condenser 113 and transfers the light returned from the condenser 113 to the light amount detector 116. For this purpose, the optical processor 112 may include a collimator lens, an anamorphic prism, a beam splitter, a wavelength plate, an achromatic lens, an enlarging lens, a wollaston prism, a condensing lens, or the like. The SIL 114 of the condenser 113 faces a disc 101.

The condenser 113 focuses the light incident through the optical processor 112 on the disc 101 as near-field light through the SIL 114 to record data on the disc 101 or read the data recorded on the disc 101. The condenser 113 receives light reflected or diffracted from the disc 101 through the SIL 114 so as to transfer the light to the optical processor 112. When a driving voltage is applied, the actuator 115 ascends or descends such that the condenser 113 ascends or descends vertically with respect to the disc 101. Therefore, when the actuator 115 ascends vertically with respect to the disc 101, the condenser 113 approaches the disc 101. When the actuator 115 descends vertically with respect to the disc 101, the condenser 113 moves away from the disc 101. When reflected or diffracted light is incident from the optical processor 112, the light amount detector 116 detects an amount of the incident light. The detected light amount may be an amount of total reflection return light. The detected light amount is transferred to the servo module 120. The light amount detector 116 may include a photo detector, or may be adapted to detect the light in another fashion.

The servo module 120 generates a gap error signal and a driving voltage for the actuator 115 depending on the return light amount received from the light amount detector 116. The servo module 120 provides the generated driving voltage to the actuator 115 and the control module 130, and provides the gap error signal to the control module 130.

The control module 130 controls the near-field optical disc apparatus 100 so as to perform a near-field gap pull-in process according to aspects of the present invention. The control module 130 controls the servo module 120 such that the condenser 113 approaches the disc 101. The servo module 120 turns on power to the light source 111, and transfers a gap error signal and a driving voltage for the actuator 115 generated depending on the return light amount received from the light amount detector 116 to the control module 130.

When a gap error signal level decreases to a near-field light detecting level, the control module 130 determines a linear section with a constant decrease rate of the gap error signal, i.e., a period of time in which the rate of decrease of the gap error signal is constant. Gap pull-in or gap servo may be performed more stably during a linear section with the constant decrease rate of the gap error signal. In order to determine the linear section, the decrease rate of the gap error signal may be differentiated to determine a section having a constant differential value (i.e., a constant derivative value). The control module 130 obtains the range of an actuator driving voltage corresponding to the section having a constant differential value of the gap error signal.

According to an example embodiment of the present invention, the control module 130 may hold or store a driving voltage value for the actuator 115 at the time when the rate of decrease of the gap error signal becomes constant as a first driving voltage value, and may hold or store a driving voltage value for the actuator 115 at the time when the constant rate of decrease of the gap error signal changes as a second driving voltage value. The control module 130 may stop the driving of the actuator 115 simultaneously with or after holding or storing the second driving voltage value. Holding indicates that the control module 130 temporarily retains the driving voltage value for the actuator 115. Thereafter, the control module 130 may apply a voltage between the first and second driving voltage values to the actuator 115 such that gap pull-in is performed stably when the driving voltage for the actuator 115 has a value between the first and second driving voltage values. The control module 130 may store the driving voltage values in the storage unit 140.

Figure 2:
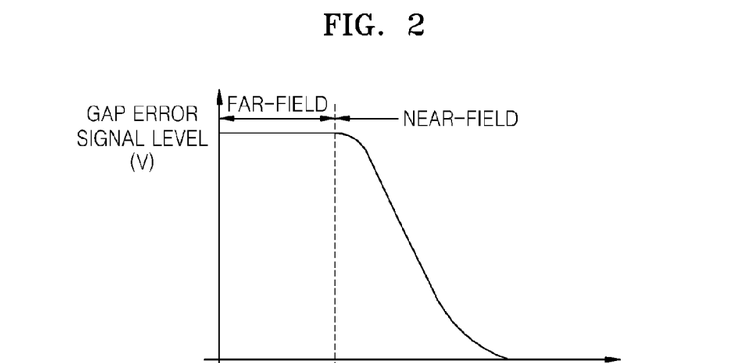
FIG. 2 illustrates a gap error signal generated when an actuator of FIG. 1 ascends, according to an example embodiment of the present invention.

FIG. 2 shows an example of a gap error signal generated in the servo module 120 when the actuator 115 ascends such that the condenser 113 approaches the disc 101. As shown in FIG. 2, the gap error signal generated in the servo module 120 maintains a constant level in the far field, decreases as the SIL 114 approaches the disc 101 in the near-field, and becomes 0 when the SIL 114 contacts the disc 101. This is because when the SIL 114 contacts the disc 101, the disc 101 absorbs all light incident from the SIL 114 so that an amount of return light reflected from the disc 101 becomes 0. Therefore, the servo module 120 may drive the actuator 115 such that the gap error signal becomes 0 in the near-field. The servo module 120 may also adjust gain and offset of the gap error signal.

Figure 3A:
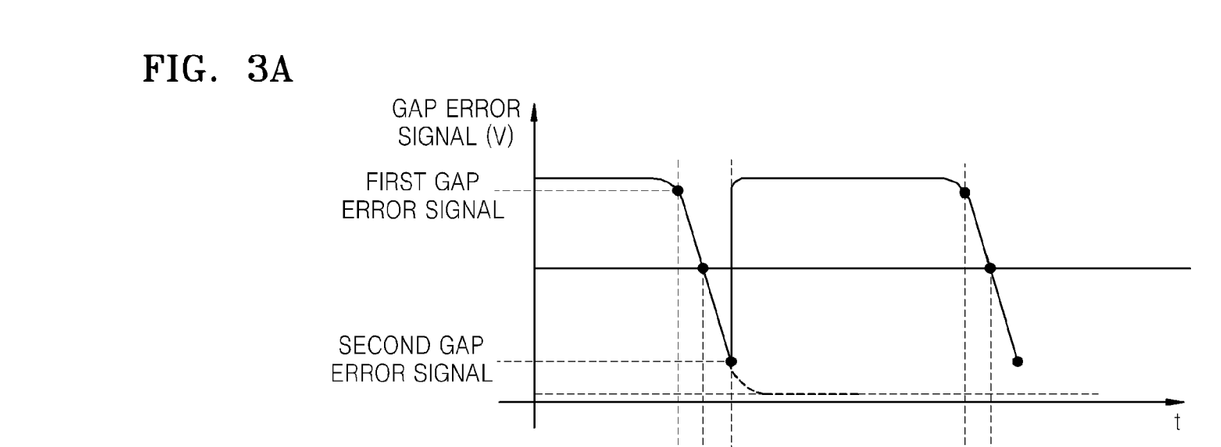
FIGS. 3A-3B illustrate a gap pull-in process using the near-field optical disc apparatus of FIG. 1, according to an example embodiment of the present invention.
Figure 3B:
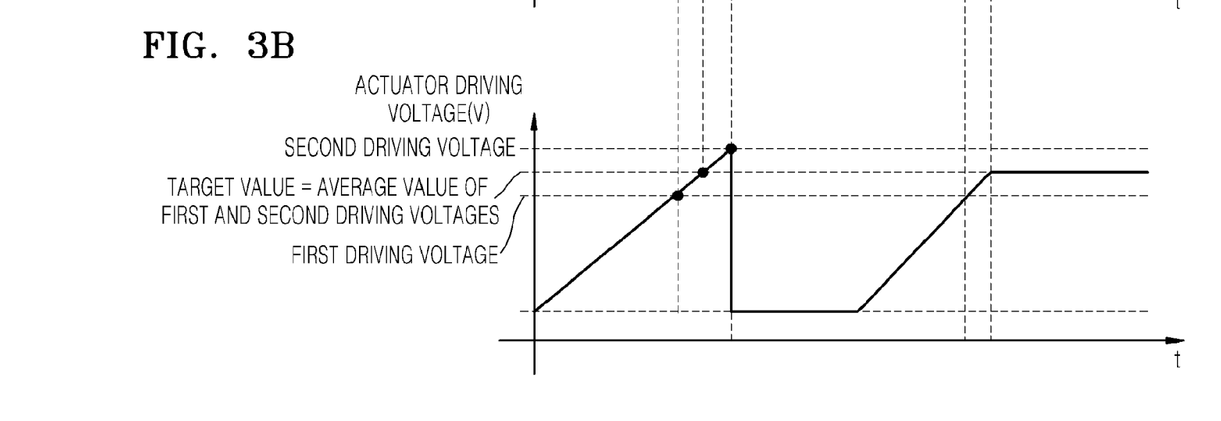

FIGS. 3A and 3B show a gap pull-in process using the near-field optical disc apparatus 100, according to an example embodiment of the present invention. The servo module 120 applies an actuator driving voltage to the actuator 115 to raise the actuator 115 as shown in FIG. 3B. As shown in FIG. 3B, the actuator driving voltage may increase linearly. The servo module 120 generates a gap error signal as shown in FIG. 3A using the return light amount received from the light amount detector 116 and transfers the generated gap error signal to the control module 130. The control module 130 determines whether light focused on the disc 101 is far-field light or near-field light using the gap error signal generated in the servo module 120. The control module 130 obtains a gap error signal level at a point where the slope of the gap error signal becomes constant in the near-field, if the light focused on the disc 101 is the near-field light. The control module 130 obtains an actuator driving voltage value corresponding to the obtained gap error signal level and holds or stores the obtained value.

In FIG. 3A, the gap error signal at the time when the slope of the gap error signal becomes constant is a first gap error signal and an actuator driving voltage value corresponding to the first gap error signal is a first driving voltage shown in FIG. 3B. The control module 130 obtains a gap error signal level at the time when the slope of the constant gap error signal changes and an actuator driving voltage value corresponding to the gap error signal level. The control module 130 holds or stores the obtained driving voltage value. In FIG. 3A, the gap error signal level at the time when the constant slope of the gap error signal changes is a second gap error signal, and an actuator driving voltage value corresponding to the second gap error signal is a second driving voltage shown in FIG. 3B. The gap error signal decreases linearly during the section between the first and second gap error signals. The control module 130 holds or stores the second driving voltage, and then controls the servo module 120 to stop the driving of the actuator 115.

Thereafter, the control module 130 controls the servo module 120 such that gap pull-in is performed between the first and second driving voltages for the actuator 115. For example, the control module 130 may control the servo module 120 such that a linearly increasing voltage is applied to the actuator 115, and gap pull-in is performed when a driving voltage for the actuator 115 has an average value of the first and second driving voltages. In FIG. 3B, gap pull-in is performed on the disc 101 when the driving voltage applied to the actuator 115 becomes an average value of the first and second driving voltages.

Figure 4A:
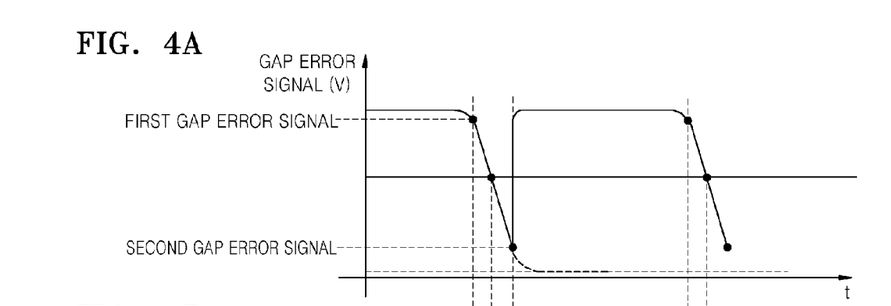
FIGS. 4A-4C illustrate a gap pull-in process using the near-field optical disc apparatus of FIG. 1 according to another example embodiment of the present invention.
Figure 4B:
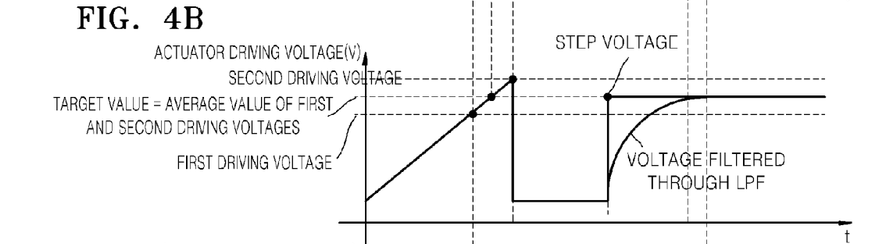

FIGS. 4A and 4B show a gap pull-in process using the near-field optical disc apparatus 100 of FIG. 1, according to another example embodiment of the present invention. Similarly to the embodiment of the FIG. 3, the control module 130 determines whether light focused on the disc 101 is near-field light using the gap error signal, and obtains a change amount of the slope of the gap error signal if the condensed light is the near-field light.

In FIG. 4A, the gap error signal at the time when the slope of the gap error signal becomes constant is a first gap error signal and an actuator driving voltage value corresponding to the first gap error signal is a first driving voltage value. The control module 130 holds or stores the first driving voltage. In FIG. 4A, the gap error signal level at the time when the constant slope of the gap error signal changes is a second gap error signal, and an actuator driving voltage value corresponding to the second gap error signal is a second driving voltage in FIG. 4B. The control module 130 may hold or store the second driving voltage, and then may control the servo module 120 to stop driving of the actuator 115.

Thereafter, the control module 130 applies a driving voltage to the actuator 115 so as to raise the actuator 115 such that the disc 101 is located at a position for performing gap servo.

The control module 130 may apply a linearly increasing driving voltage to the actuator 115, as shown in FIG. 3B. Alternatively, the control module 130 may apply an exponentially increasing driving voltage to the actuator 115 in order to avoid collision with the disc 101, as shown in FIG. 4B.

The control module 130 controls the servo module 120 such that gap pull-in is performed when the driving voltage for the actuator 115 is between the first and second driving voltages. This is because the gap pull-in can be performed stably between the first and second driving voltages corresponding to the section between the first and second gap error signals where the gap error signal decreases linearly. The control module 130 may also obtain an average value of the first and second driving voltages and control the servo module 120 such that the gap pull-in is performed when the driving voltage applied to the actuator 115 becomes equal to the average value. The control module 130 may apply to the actuator 115 a voltage that has an exponential curved shape and that has the average value of the first and second driving voltages as a maximum value. This is because, when the gap pull-in is performed at the driving voltage level for the actuator 115 corresponding to the average value of the first and second gap error signals, the gap pull-in can be performed more stably. For this purpose, the control module 130 may generate a step voltage having the average value of the first and second driving voltages as the maximum value and filter the generated step voltage through a low pass filter (LPF) to generate a voltage as an exponential function having the average of the first and second driving voltages as the maximum value. The control module 130 may apply the generated voltage to the actuator 115 to drive the actuator 115. The step voltage and the voltage filtered through the LPF are shown in FIG. 4B.

The control module 130 may set the average value of the first and second error signals to a target point. Since the gap error signal decreases linearly between the first and second gap error signals, and the driving voltage for the actuator 115 increases linearly between the first and second driving voltages corresponding to the first and second gap error signals, respectively, the driving voltage value corresponding to the average value of the first and second gap error signals becomes equal to the average value of the first and second driving voltages. When the average value of the first and second gap error signals is set to the target point, the control module 130 controls such that gap servo is performed at the pull-in level. Therefore, since the gap pull-in and the gap servo are performed together, the gap pull-in time is reduced.

Figure 4C:
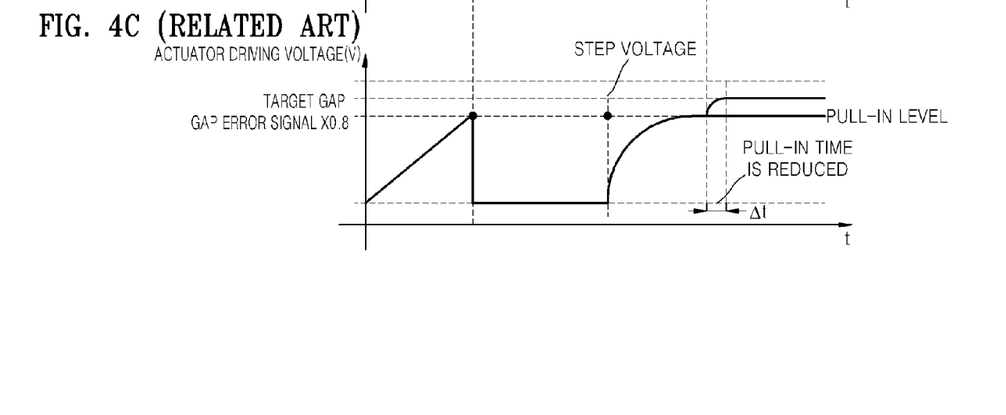

FIG. 4C shows a conventional pull-in method. The pull-in process according to aspects of the present invention can reduce the gap pull-in time as compared with the conventional pull-in method shown in FIG. 4C. Referring to FIG. 4C, the control module 130 considers an area where a driving voltage applied to the actuator 115 corresponds to 80% of a driving voltage in the far-field, as the near-field area, holds or stores the driving voltage in the area, and then stops the driving of the actuator 115. The control module 130 sets the held or stored driving voltage to a pull-in level, generates a voltage as an exponential function having the held or stored driving voltage as the maximum value, and applies the generated voltage to the actuator 115. Because the driving voltage value corresponding to the target level of the gap error signal does not correspond to the pull-in level, the control module 130 applies an additional voltage to the actuator 115 to control such that the disc 101 is located at the driving voltage level corresponding to the target level of the gap error signal. In this case, the time $\Delta t$ is taken for the driving voltage to reach the target level after reaching the pull-in level, as shows in FIG. 4C. As can be seen in FIG. 4C, according to aspects of the present invention, the gap pull-in time can be reduced as much as the time Δt as compared to a conventional pull-in method.

Figure 5:
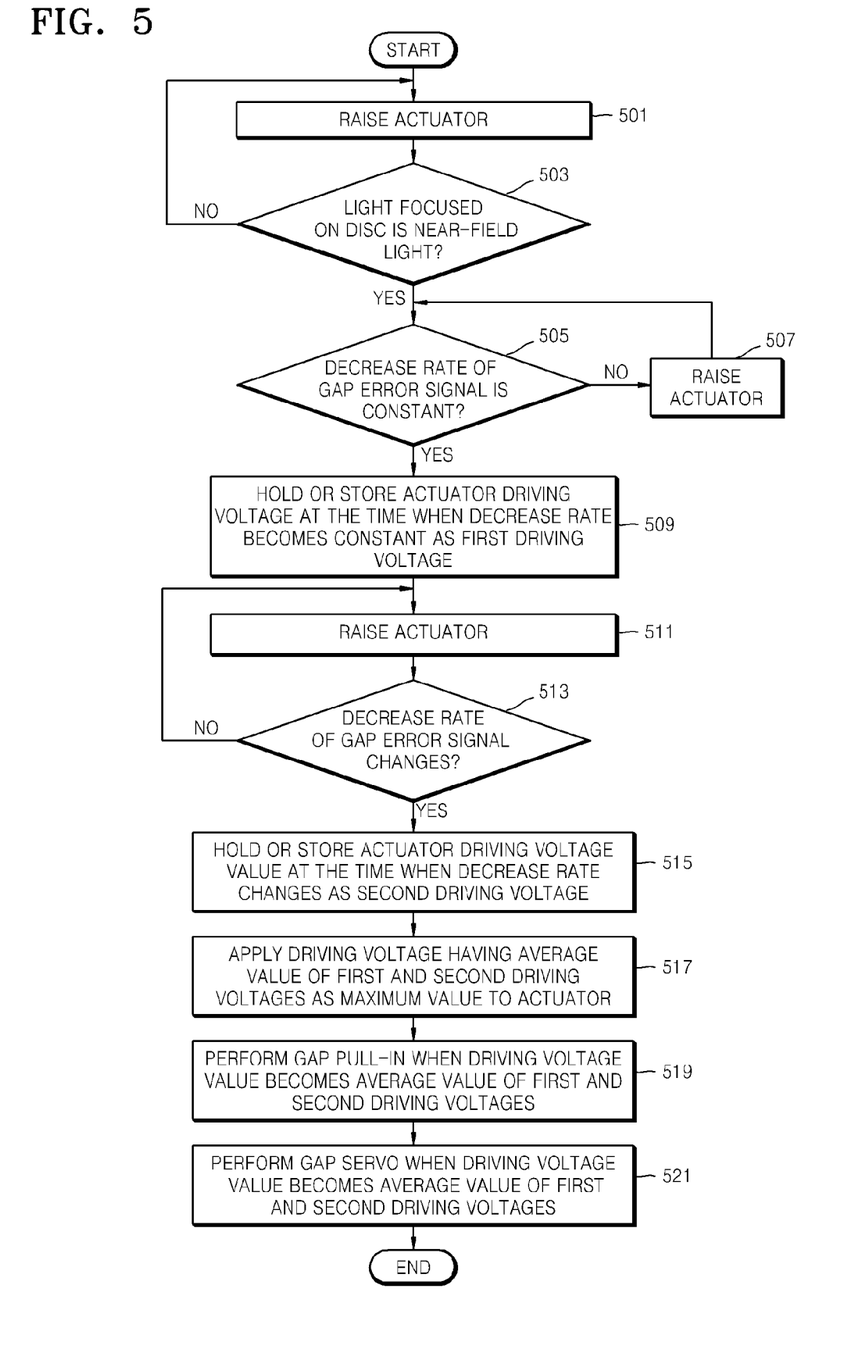
FIG. 5 is a flow chart of a gap pull-in process according to an example embodiment of the present invention.

FIG. 5 is a flow chart of a gap pull-in process according to an example embodiment of the present invention. Hereinafter, the gap pull-in process will be described with reference to FIGS. 1 and 5; however, the gap pull-in process as shown in FIG. 5 may be employed with apparatuses other than the apparatus 100 shown in FIG. 1. The control module 130 raises the actuator 115 of the near-field optical disc apparatus 100 at block S501. The control module 130 determines whether light focused on the disc 101 loaded on the near-field optical disc apparatus 100 is near-field light using a gap error signal generated by the servo module 120 at block S503. The control module 130 may determine whether light condensed on the disc 101 is near-field light using the fact that a gap error signal level is constant in the case where the light is far-field light and decreases in the case where the light is near-field light.

If the light condensed on the disc 101 is near-field light, the control module 130 determines whether the decrease rate of the gap error signal is constant at block S505. For this purpose, the control module 130 differentiates the slope of the gap error signal and determines whether the differentiated value is constant. When the slope of the gap error signal is not constant and continuously decreases, the control module 130 continuously applies a driving voltage to the actuator 115 to raise the actuator 115 at block S507. When the slope of the gap error signal is constant, the control module 130 holds or stores the driving voltage value for the actuator 115 at the time when the slope (decrease rate) becomes constant as a first driving voltage at block S509, and determines whether the decrease rate of the gap error signal while continuously raising the actuator 115 at blocks S511 and S513.

If the constant decrease rate of the gap error signal changes, the control module 130 holds or stores the driving voltage value for the actuator 115 at the time when the decrease rate changes as a second driving voltage at block S515. The control module 130 may stop driving of the actuator 115 simultaneously with or after holding or storing the second driving voltage. The control module 130 applies a driving voltage having the average value of the first and second driving voltages as the maximum value to the actuator 115 at block S517. As described above, the control module 130 may generate a step voltage having the average value of the first and second driving voltages as the maximum value, filter the step voltage through an LPF, and apply the voltage as an exponential function to the actuator 115.

The control module 130 performs gap pull-in when the driving voltage has the average value of the first and second driving voltages at block S519. When the gap pull-in level reaches a driving voltage level corresponding to the target level of the gap error signal and the driving voltage has the average value of the first and second driving voltages, the control module 130 may also perform gap pull-in and gap servo simultaneously, at block S521. In this case, since the gap pull-in and the gap servo are performed at the same point, the gap pull-in time can be reduced.

According to the above example embodiments, the gap servo is performed during the section where the gap error signal changes linearly to prevent the SIL from colliding with the disc because of overshoot in gap pull-in using the near-field optical disc apparatus, thereby stably performing the gap pull-in operation.

A program to perform a gap pull-in process according to aspects of the present invention can be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, or the like. The computer readable recording medium can also be distributed over network coupled computer systems so that the computer readable code is stored and executed in a distributed fashion.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the apparatus 100 may be a recording apparatus, a reproducing apparatus, or both a recording and a reproducing apparatus. Similarly, the apparatus 100 may be employed to record/reproduce data to/from any type of storage medium, such as a CD, DVD, or Blu-ray disc. Accordingly, it is intended, therefore, that the present invention not be limited to the various example embodiments disclosed, but that the present invention includes all embodiments falling within the scope of the appended claims.

What is claimed is:

1. A gap pull-in method, comprising:
    determining whether light focused on a disc as an actuator ascends is near-field light, based on a gap error signal;
    obtaining a range of an actuator driving voltage value during a period of time in which a decrease rate of the gap error signal is constant in response to the light focused on the disc being near-field light; and
    performing gap pull-in on the disc during a period of time in which the actuator driving voltage value is within the obtained range.

2. The gap pull-in method of claim 1, wherein whether the decrease rate of the gap error signal is constant is determined by:
    differentiating a slope of the gap error signal; and
    determining whether the differentiated value is constant.

3. The gap pull-in method of claim 1, wherein:
    the obtaining of the range of the actuator driving voltage value comprises:
        holding or storing an actuator driving voltage value at a time when the decrease rate of the gap error signal becomes constant as a first driving voltage value; and
        holding or storing an actuator driving voltage value at a time when the constant decrease rate of the gap error signal changes as the actuator ascends as a second driving voltage value; and
    the gap pull-in is performed on the disc during a period of time in which the actuator driving voltage value is between the first and second driving voltage values.

4. The gap pull-in method of claim 3, further comprising stopping driving of the actuator after the holding or storing of the second driving voltage value.

5. The gap pull-in method of claim 3, wherein the performing of the gap pull-in on the disc comprises:
    obtaining an average value of the first and second driving voltage values; and applying a voltage to the actuator as a driving voltage, the driving voltage comprising the average value of the first and second driving voltage values as a maximum value.

6. The gap pull-in method of claim 5, wherein the applying of the driving voltage to the actuator comprises:
generating a step voltage comprising the average value of the first and second driving voltage values as a maximum value;
filtering the step voltage through a low pass filter;
applying the filtered voltage to the actuator as a driving voltage; and
performing gap pull-in on the disc in response to the applied driving voltage being within a predetermined range of the average value of the first and second driving voltage values.

7. The gap pull-in method of claim 6, further comprising performing gap servo in response to the applied driving voltage being within the predetermined range of the average value of the first and second driving voltage values.

8. An optical disc apparatus, comprising:
a condenser configured to:
focus light radiated from a light source onto a disc; and
receive light returned from the disc;
an actuator configured to raise or lower the condenser vertically with respect to the disc based on an actuator driving voltage;
a light amount detector configured to detect an amount of light returned from the disc through the condenser;
a servo module configured to generate the actuator driving voltage and a gap error signal based on the light amount detected by the light amount detector; and
a control module configured to:
obtain a range of the actuator driving voltage during a period of time in which the decrease rate of the gap error signal is constant based on the gap error signal and the actuator driving voltage generated by the servo module, in response to light focused on the disc being near-field light; and
control the servo module such that gap pull-in is performed on the disc during a period of time in which the actuator driving voltage value provided from the servo module is within the obtained range.

9. The optical disc apparatus of claim 8, wherein the control module is further configured to:
differentiate the slope of the gap error signal; and
determine whether the decrease rate of the gap error signal is constant based on whether the differentiated value is constant.

10. The optical disc apparatus of claim 8, wherein the control module is further configured to:
hold or store an actuator driving voltage value at the time when the decrease rate of the gap error signal becomes constant as a first driving voltage value,
hold or store an actuator driving voltage value at the time when the actuator ascends and the constant decrease rate of the gap error signal changes as a second driving voltage value, and
controls the servo module such that the gap pull-in is performed during a period of time in which the actuator driving voltage value is between the first and second driving voltage values.

11. The optical disc apparatus of claim 10, wherein the control module is further configured to control the servo module to stop the driving of the actuator while holding or storing the second driving voltage value.

12. The optical disc apparatus of claim 10, wherein the control module is further configured to control the servo module to apply a driving voltage to the actuator, the driving voltage comprising an average value of the first and second driving voltages as a maximum value.

13. The optical disc apparatus of claim 12, wherein the control module is further configured to:
control the servo module to generate a step voltage comprising the average value of the first and second driving voltages as the maximum value;
filter the step voltage through a low pass filter;
apply the filtered voltage to the actuator as a driving voltage; and
perform gap pull-in for the disc in response to the applied driving voltage becoming equal to the average value of the first and second driving voltage values.

14. The optical disc apparatus of claim 13, wherein the control module is further configured to control the servo module such that gap servo is performed in response to the applied driving voltage value becoming equal to the average value of the first and second driving voltage values.

15. A non-transitory computer-readable recording medium storing a program to execute a gap pull-in method, the gap pull-in method comprising:
determining whether light focused on a disc as an actuator ascends is near-field light using a gap error signal;
obtaining a range of an actuator driving voltage value during a period of time in which a decrease rate of the gap error signal is constant, in response to the light focused on the disc being near-field light; and
performing gap pull-in on the disc during a period of time in which the actuator driving voltage value is within the obtained range.

16. A recording and/or reproducing apparatus to record data to or read data from an optical disc, the apparatus comprising:
an optical pickup configured to:
focus light onto the optical disc; and
receive light reflected from the optical disc to record data on the optical disc and/or reproduce data from the optical disc;
a servo module configured to:
generate an actuator driving voltage and a gap error signal based on an amount of light received by the optical pickup; and
control raising or lowering of the optical pickup based on the actuator driving voltage; and
a control unit configured to:
determine a range of the actuator driving voltage during a period of time in which a rate of change of the gap error signal is a constant and the light focused on the optical disc is near-field light, based on the gap error signal and the actuator driving voltage; and
control the servo module to perform gap pull-in on the optical disc during a period of time in which the actuator driving voltage is within the determined range.

17. The apparatus of claim 16, wherein the control unit is further configured to:
determine a value of the actuator driving voltage in response to a rate of decrease of the gap error signal becoming a constant as a first driving voltage value;
determine a value of the actuator driving voltage in response to the rate of decrease of the gap error signal ceasing to be a constant as a second driving voltage value; and determine the range as a range between the first driving voltage value and the second driving voltage value.

18. The apparatus of claim 17, further comprising a storage unit configured to store the first driving voltage value and the second driving voltage value.

19. The apparatus of claim 17, wherein the control unit is further configured to control the servo module to perform the gap pull-in in response to the gap error signal being equal to an average value of the first driving voltage value and the second driving voltage value.

20. The apparatus of claim 16, further comprising an actuator configured to raise or lower the optical pickup based on the control of the servo module.

* * * * *